US008146143B1

(12) United States Patent
Emigh et al.

(10) Patent No.: US 8,146,143 B1
(45) Date of Patent: Mar. 27, 2012

(54) FRAUD DETECTION

(75) Inventors: Aaron T. Emigh, Incline Village, NV (US); James A. Roskind, Redwood City, CA (US)

(73) Assignee: James A. Roskind, Redwood City, CA (US)

( * ) Notice: Subject to any disclaimer, the term of this patent is extended or adjusted under 35 U.S.C. 154(b) by 742 days.

(21) Appl. No.: 11/394,764

(22) Filed: Mar. 31, 2006

Related U.S. Application Data

(60) Provisional application No. 60/667,333, filed on Mar. 31, 2005.

(51) Int. Cl.
*G06F 21/00* (2006.01)
(52) U.S. Cl. ............... 726/6; 726/5; 726/20; 726/30; 713/1; 713/155; 713/169; 380/28; 380/277; 380/279
(58) Field of Classification Search .......... 726/5, 20, 726/30; 713/1, 155, 169; 380/28, 277, 279
See application file for complete search history.

(56) References Cited

U.S. PATENT DOCUMENTS

| | | | | |
|---|---|---|---|---|
| 6,339,830 | B1 * | 1/2002 | See et al. | 726/15 |
| 6,662,228 | B1 * | 12/2003 | Limsico | 709/225 |
| 7,032,026 | B1 * | 4/2006 | Biswas et al. | 709/229 |
| 2001/0034837 | A1 * | 10/2001 | Kausik et al. | 713/185 |
| 2003/0163737 | A1 * | 8/2003 | Roskind | 713/201 |
| 2006/0059346 | A1 * | 3/2006 | Sherman et al. | 713/175 |

\* cited by examiner

*Primary Examiner* — Taghi Arani
*Assistant Examiner* — Gregory Lane
(74) *Attorney, Agent, or Firm* — Mahamedi Paradice Kreisman LLP

(57) ABSTRACT

In some embodiments, techniques for information security include receiving information related to an authentication credential, wherein the information is related to a failed authentication attempt; determining whether the authentication credential is related to a valid account; and performing a security measure related to the valid account, if it is determined that the authentication credential is related to the valid account.

In some embodiments, techniques for information security include Determining that an authentication attempt has failed, applying a privacy-performing transformation such as a cryptographic hash or encryption to an authentication credential, and distributing the privacy-preserved credential.

In some embodiments, techniques for information security include receiving and redistributing a privacy-preserved authentication credential.

16 Claims, 4 Drawing Sheets

FRAUD DETECTION

CROSS REFERENCE TO RELATED APPLICATIONS

This application claims priority to U.S. Provisional Patent Application No. 60/667,333 entitled Electronic Processing Improvements, filed Mar. 31, 2005, which is incorporated herein by reference for all purposes.

FIELD OF THE INVENTION

The present invention relates generally to the area of information security. More specifically, techniques for detecting fraud are disclosed.

BACKGROUND OF THE INVENTION

An increasing volume of confidential information, such as personal and financial information, is being stored electronically, in locations accessible through electronic networks such as the internet. This information has value to parties who can illicitly gain access to such information. In many cases, credentials used to access information at one institution may also be used to access information at another institution. The use of a credential incorrectly at one institution may signal potential fraud at a second institution at which the credential is valid. Current information security technologies do not provide proactive detection of such potential fraud.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
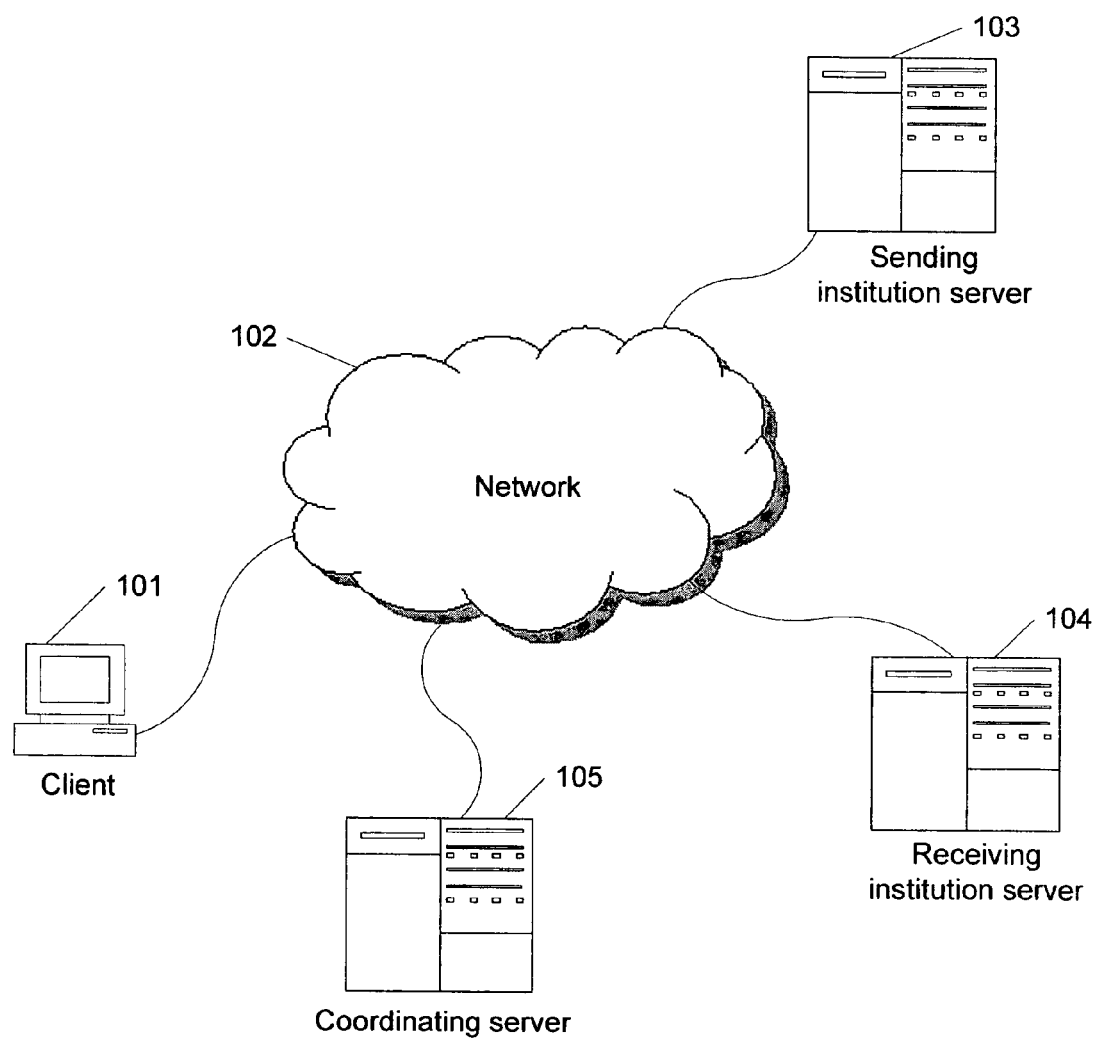
FIG. 1 is a diagram of a system for detecting and reacting to fraud, according to some embodiments.

FIG. 1 is a diagram of a system for detecting and reacting to fraud, according to some embodiments. In this example, a client 101 may be connected to a network 102. A client may be any device capable of communicating via a network 102, including a personal computer, a PDA, or a cell phone.

The network 102 may be any type of network, for example a public network such as the internet or a cellular phone network. In another example, the network 102 may be an enterprise or home network, a virtual private network, a proprietary network, or a wireless network such as an 802.11 or Bluetooth network. In some embodiments, the network 102 may include more than one network. An example of a network 102 including more than one network is a local area network connected to a public network such as the internet.

A sending institution server 103 may be connected to the network 102. The sending institution server 103 may provide information related to attempts at fraud such as identity theft. Examples of a sending institution server 103 include a server associated with a financial institution such as a bank, a server associated with a corporate intranet, and any other server that may be associated with an issuer of confidential information and/or a target of fraud relating to misuse of confidential information.

Identity theft refers herein to the misappropriation of any confidential information, such as a credential and/or other information related to identity. Examples of information related to identity include a user name, a password, a financial identifier such as a credit card number or bank account number, a social security number, a driver's license number, medical information, and personal information such as a mother's maiden name, birthday or place of birth.

A receiving institution server 104 may receive reports of potential attempts at fraud such as identity theft, for example directly or indirectly from the sending institution server 103. Examples of a receiving institution server 104 include a server associated with a financial institution such as a bank, a server associated with a corporate intranet, and any other server that may be associated with an issuer of confidential information and/or a target of fraud relating to misuse of confidential information.

In some embodiments, a coordinating server 105 may act as an intermediary between a sending institution server 103 and a receiving institution server 104. Examples of acting as an intermediary include storing and forwarding data relating to potential fraud attempts, providing selective access to such data to parties authorized to access it, and processing of such data in a privacy-preserving manner, such as encrypting and/or generating keyed hashes of the data.

Figure 2:
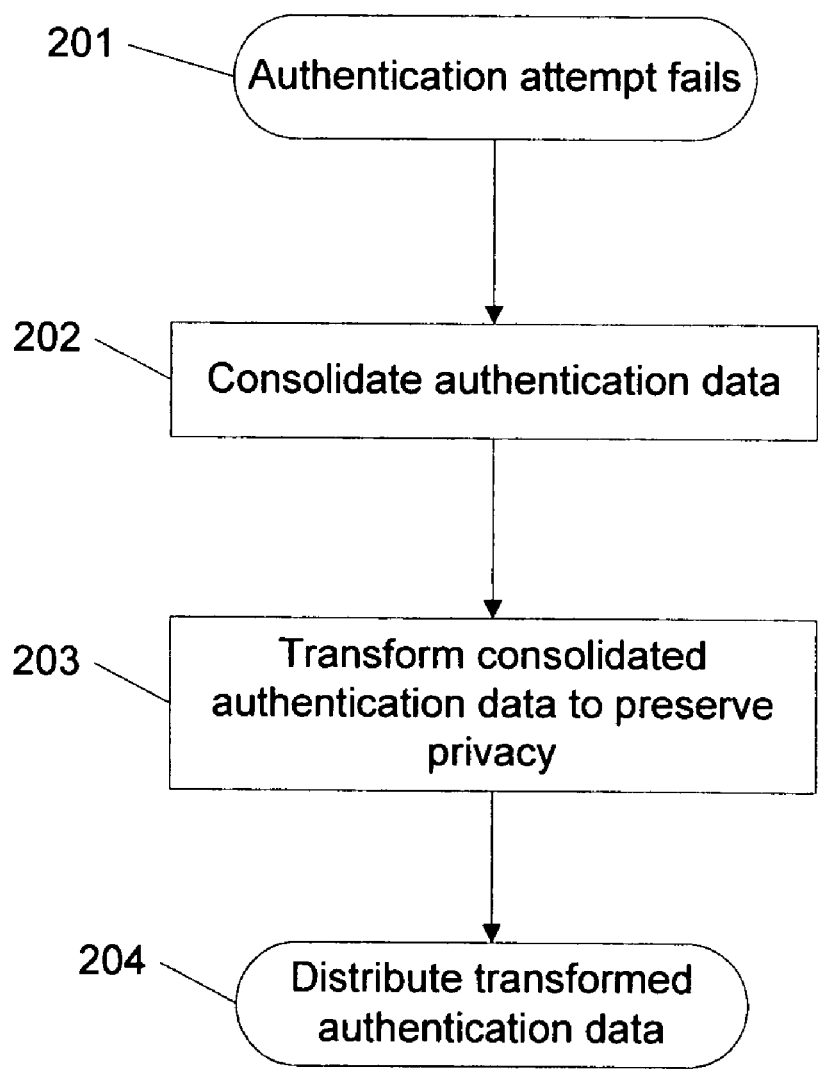
FIG. 2 is a flow diagram of a method for distributing failed authentication information, according to some embodiments.

FIG. 2 is a flow diagram of a method for distributing failed authentication information, according to some embodiments. In some embodiments, the technique of this FIG. 2 may be performed by a sending institution server 103 of FIG. 1. In this example, an authentication attempt fails (201). An example of a failed authentication attempt is an attempt to log into an account in which one or more credentials are invalid. A credential refers herein to any verifiable element that may be used for authentication. Examples of a credential include a user name (also referred to herein as an account name), a password, a one-time or time-varying passcode, and an informational credential such as a birthdate, birthplace or mother's maiden name. Another example of a failed authentication attempt is an attempt that failed, which was not followed within a short time period (such as two minutes) and/or from the same client (determined, for example, by IP address) by a successful authentication attempt. An example of an account is a financial services account, such as a banking or brokerage account. An example of a failed authentication attempt is login information such as an account name and password, or an account name, password and one-time passcode, that is not valid. An example of a one-time passcode is a one-time or time variant code generated by a device, such as an RSA SecurID token.

Authentication data may be consolidated (202). An example of consolidating authentication data is to combine credentials associated with the authentication data, such as an account name and password, or account name, password and one-time passcode, for example by concatenating them. The consolidated authentication data may be transformed to preserve privacy (203). An example of a privacy-preserving transformation is a cryptographic hash, such as a SHA1 or MD5 hash. In some embodiments, cryptographically hashing the authentication data may include keyed hashing. Keyed hashing refers herein to hashing data in combination with a key, for example a secret key shared with another entity such as a receiving institution server 104 of FIG. 1. Another example of a privacy-preserving transformation is encryption, for example encryption using a secret symmetric key or the public half of a public/private key pair. In some such embodiments, the secret symmetric key or the private half of the public/private key pair may be known to a coordinating server 105 of FIG. 1.

Transformed authentication data may be distributed (204). An example of distributing the transformed authentication data is to transmit it to a receiving server 104 of FIG. 1, for example using the network 102 of FIG. 1. Another example of distributing the transformed authentication data is to transmit it to a coordinating server 105 of FIG. 1, for example using the network 102 of FIG. 1.

Figure 3:
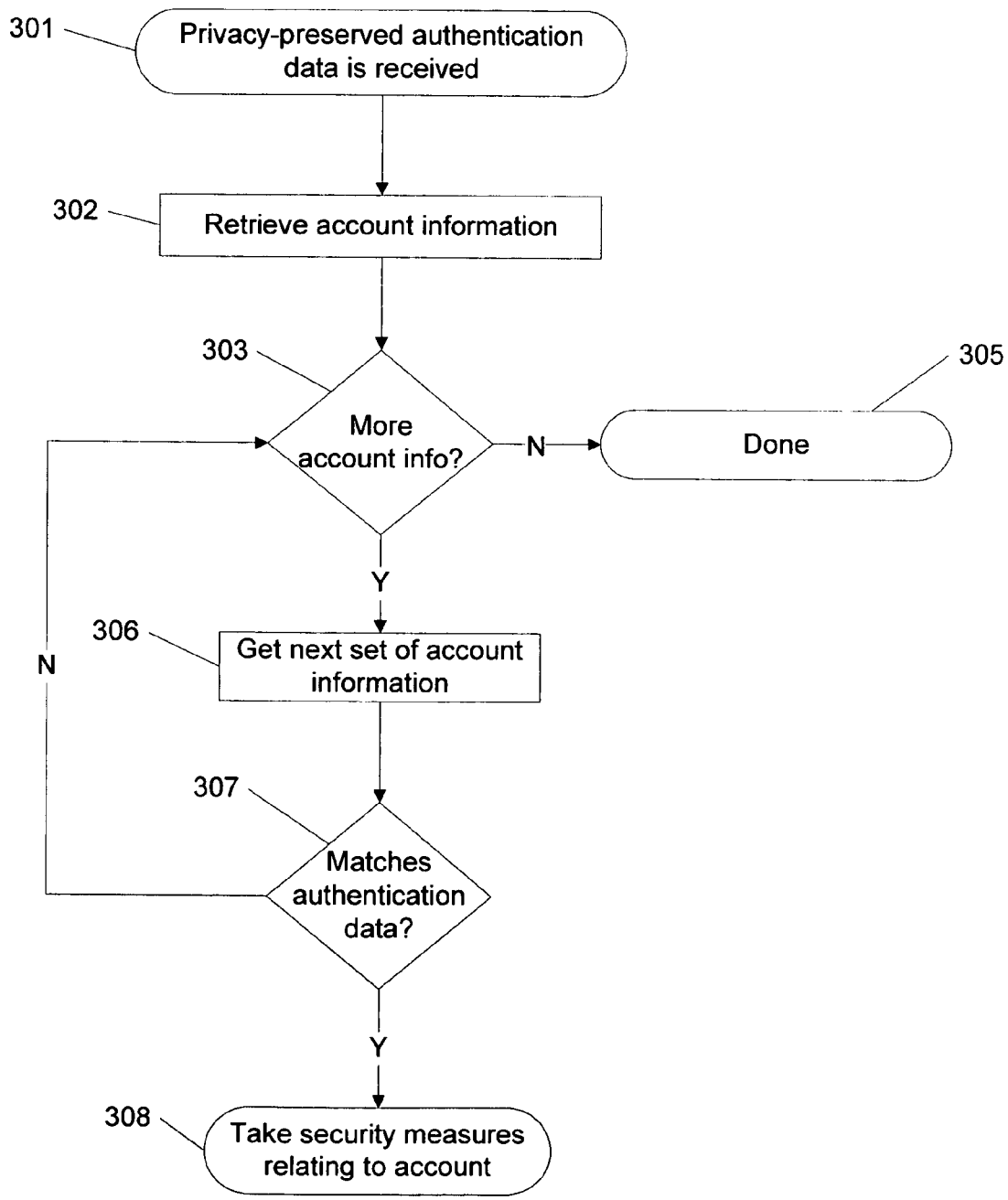
FIG. 3 is a flow diagram of a method for detecting fraud, according to some embodiments.

FIG. 3 is a flow diagram of a method for detecting fraud, according to some embodiments. In some embodiments, the technique of this FIG. 3 may be performed by a receiving institution server 104 of FIG. 1. In this example, privacy-preserved authentication data is received (301). Examples of authentication data are discussed in conjunction with 201 of FIG. 2, and may include login credentials and/or second-factor authentication information. Examples of privacy-preserved authentication data are discussed in conjunction with 203 of FIG. 2, and include data that has been processed using cryptographic hashing, keyed cryptographic hashing, and/or encryption. In some embodiments, privacy-preserved authentication data may be received from a sending institution server 103 of FIG. 1. In some embodiments, privacy-preserved authentication data may be received from a coordinating server 105 of FIG. 1.

Account information relating to valid accounts may be retrieved (302). In some embodiments, information relating to valid accounts may be pre-processed with a privacy-preserving transformation such as a cryptographic hash or keyed hash. An example of retrieving account information is to retrieve the information, or entire or partial metadata associated with the account information, from a filesystem and/or a database such as a relational database.

It may be determined whether another account remains to be processed (303). If it is determined that there is not another account to process (303), then in this example processing is complete (305). If it is determined that another account remains to be processed (303), then in this example a next set of account information may be retrieved (306), for example from memory or from a database such as a relational database.

It may be determined whether the current set of account information matches the privacy-preserved authentication data (307). An example of determining whether the current set of account information matches the privacy-preserved authentication data is to determine whether they are substantially the same. Another example of determining whether the current set of account information matches the privacy-preserved authentication data is to transform the current set of account information, for example using a cryptographic hash, keyed cryptographic hash or encryption, and determine whether they are substantially the same.

If it is determined that the current set of account information does not match the privacy-preserved authentication data (307), then in this example it may be determined whether another account remains to be processed (303).

If it is determined that the current set of account information matches the privacy-preserved authentication data (307), then in this example security measures relating to the current account may be taken (308). An example of a security measure relating to an account is to restrict access to the account. One example of restricting access to an account is to disable online access to an account, for example temporarily. Another example of restricting access to an account is to require additional authentication, such as answers to one or more questions associated with the account, or a phone call to enable access to the account. Another example of a security measure relating to an account is to contact an accountholder, for example via phone or email, and inform the account holder that his account(s), at the detecting institution and/or at another institution, may be at risk of fraud.

In some embodiments, the techniques of 303-307 may be performed using other implementations, such as batch processing in which more than one set of authentication data is checked at each iteration, and/or using a data structure such as a hash table instead of a linear search for matches.

Figure 4:
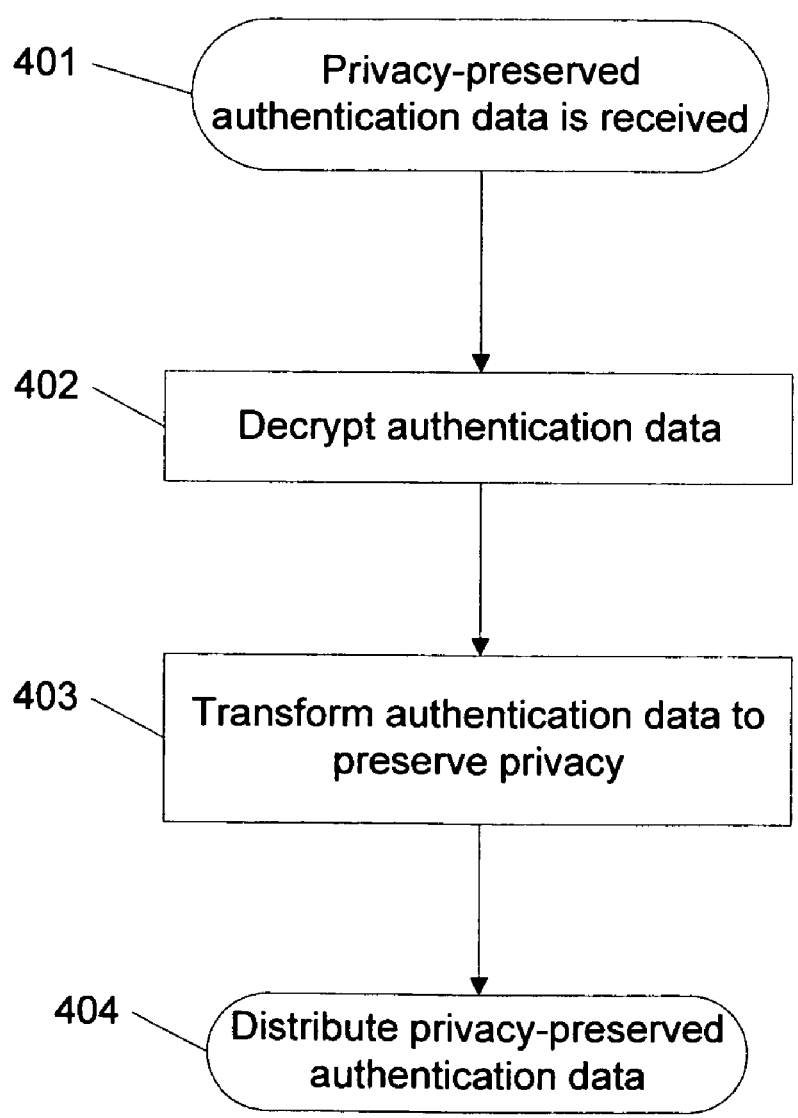
FIG. 4 is a flow diagram of a method for distributing privacy-preserved authentication data, according to some embodiments.

FIG. 4 is a flow diagram of a method for distributing privacy-preserved authentication data, according to some embodiments. In some embodiments, the technique of this FIG. 4 may be performed by a coordinating server 105 of FIG. 1. In this example, privacy-preserved authentication data is received (401). Examples of authentication data are discussed in conjunction with 201 of FIG. 2, and may include login credentials and/or second-factor authentication information. Examples of privacy-preserved authentication are discussed in conjunction with 203 of FIG. 2, and include data processed with cryptographic hashing, keyed cryptographic hashing, and/or encryption. In some embodiments, privacy-preserved authentication data may be received from a sending institution server 103 of FIG. 1.

In some embodiments, such as embodiments in which the authentication data is encrypted as discussed in conjunction with 203 of FIG. 2, the authentication data may be decrypted (402), for example using a symmetric key or the private half of a public/private key pair.

In some embodiments, authentication data may be transformed to preserve privacy (403). Examples of transformations to preserve privacy are discussed in conjunction with 203 of FIG. 2, and include cryptographic hashing, keyed cryptographic hashing and encryption, such as encryption with the public half of a public/private key pair or a secret symmetric key.

Privacy-preserved authentication data may be distributed (404). An example of distributing privacy-preserved authentication data is to transmit it to a receiving institution server 104 of FIG. 1. In some embodiments, access controls may be imposed prior to distributing privacy-preserved authentication data, such as receiving a request for privacy-preserved authentication data and requiring authentication such as a proof of possession of a secret before providing such information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for imposing electronic security at a first secure site, the method comprising:
   using one or more processors to perform steps comprising:
   receiving information related to (i) an authentication credential, and (ii) a failed authentication attempt that occurs at a second secure site that is independent of the first site;
   making a determination that the authentication credential, received as information related to the failed authentication attempt that occurred at the second site, is related to a valid account maintained at the first secure site; and
   performing, at the first secure site, a security measure related to the valid account in response to the determination that the authentication credential is related to the valid account;
   wherein receiving information related to the authentication credential includes receiving the information in a privacy-preserving form, including in the form of a cryptographic hash.

2. The method of claim 1, wherein the cryptographic hash includes a key.

3. The method of claim 1, wherein the privacy-preserving form includes encryption.

4. The method of claim 1, wherein the authentication credential includes an account name.

5. The method of claim 1, wherein the authentication credential includes a password.

6. The method of claim 1, wherein the failed authentication attempt occurs at a site of a financial institution.

7. The method of claim 1, wherein making the determination as to whether the authentication credential is related to the valid account includes determining whether the authentication credential is equivalent to information associated with the valid account.

8. The method of claim 7, further comprising transforming the information associated with the valid account with a privacy-preserving transformation.

9. The method of claim 1, wherein receiving information includes receiving at least a portion of the information from a sending institution server.

10. The method of claim 1, wherein receiving information includes receiving at least a portion of the information from a coordinating server.

11. A system for electronic security, the system being implemented on a first secure site, the system comprising:
   a processor configured to:
      receive information related to (i) an authentication credential, and (ii) a failed authentication attempt at a second secure site that is independent of the first secure site;
      wherein the information is received in a privacy-preserving form, including in the form of a cryptographic hash;
      make a determination that the authentication credential, received as information related to the failed authentication attempt that occurred at the second site, is related to a valid account maintained at the first secure site; and
      perform, at the first secure site, a security measure related to the valid account in response to the determination that the authentication credential is related to the valid account; and
   a memory coupled with the processor, wherein the memory provides instructions to the processor.

12. The system of claim 11, wherein the authentication credential includes at least one of an account name and a password.

13. A non-transitory computer readable storage medium that stores instructions that are to be implemented on a first secure site, the instructions including instructions for:
   receiving information related to (i) an authentication credential, and (ii) a failed authentication attempt at a second secure site that is independent of the first secure site;
   wherein the information is received in a privacy-preserving form, including in the form of a cryptographic hash;
   making a determination that the authentication credential, received as information related to the failed authentication attempt that occurred at the second site, is related to a valid account at another secure site; and
   performing, at the first secure site, a security measure related to the valid account at the other secure site in response to the determination that the authentication credential is related to the valid account.

14. The medium of claim 13, wherein the authentication credential includes at least one of an account name and a password.

15. The method of claim 1, wherein receiving information includes receiving at least some of the authentication information for the account of the second secure site.

16. The system of claim 11, wherein the received information includes at least some of the authentication information for the account of the second secure site.

* * * * *